(12) United States Patent
Jeong et al.

(10) Patent No.: US 9,077,791 B2
(45) Date of Patent: Jul. 7, 2015

(54) DISPLAY MODULE AND MOBILE TERMINAL HAVING THE SAME

(75) Inventors: Seongkwon Jeong, Seoul (KR); Myungcheol Baek, Seoul (KR); Jinuk Park, Seoul (KR); Hyunho Lee, Seoul (KR); Hangjune Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 13/591,940

(22) Filed: Aug. 22, 2012

(65) Prior Publication Data

US 2013/0242226 A1  Sep. 19, 2013

(30) Foreign Application Priority Data

| Mar. 16, 2012 | (KR) | .......................... 10-2012-0027259 |
| Mar. 16, 2012 | (KR) | .......................... 10-2012-0027260 |
| Apr. 27, 2012 | (KR) | .......................... 10-2012-0044621 |

(51) Int. Cl.
| *H04M 1/02* | (2006.01) |
| *G06F 1/16* | (2006.01) |
| *G02F 1/1335* | (2006.01) |
| *F21V 8/00* | (2006.01) |
| *G02F 1/1333* | (2006.01) |

(52) U.S. Cl.
CPC ........... *H04M 1/0266* (2013.01); *G06F 1/1637* (2013.01); *G02F 1/133512* (2013.01); *G02B 6/005* (2013.01); *G02B 6/0055* (2013.01); *G02F 2001/133317* (2013.01)

(58) Field of Classification Search
CPC .................. G02F 1/133608; G02F 1/133308; G02F 1/133615; G02F 1/133512; G02F 1/1333; G02F 1/133611; G02F 1/1335; G02F 2001/133314; G02F 2001/13415; G02F 2001/133317; G02F 2001/133388; G02F 2201/46; G02B 6/0065; G02B 5/003
USPC ................ 349/58, 65, 61, 62, 110, 187, 153; 362/97.1, 600, 632, 633, 97.2, 382, 362/310, 602, 615, 624, 627, 634; 257/98; 345/102, 87; 312/223.1
See application file for complete search history.

(56) References Cited

U.S. PATENT DOCUMENTS

| 5,739,880 A | * | 4/1998 | Suzuki et al. .................. 349/110 |
| 5,889,569 A | * | 3/1999 | Okamoto et al. ............. 349/110 |
| 6,954,243 B2 | * | 10/2005 | Ota et al. ....................... 349/110 |

(Continued)

FOREIGN PATENT DOCUMENTS

| CN | 1392440 A | 1/2003 |
| CN | 101452150 A | 6/2009 |

(Continued)

*Primary Examiner* — Thoi Duong
(74) *Attorney, Agent, or Firm* — Birch, Stewart, Kolasch & Birch, LLP

(57) ABSTRACT

Display module and mobile terminal having the same are provided. The display module includes a liquid crystal display panel configured to output a color per pixel, a backlight unit configured to uniformly project light to a rear side of liquid crystal display panel, a backlight unit having a light guide plate and a light source, a mold located at a perimeter of the liquid crystal display panel and a perimeter of the backlight unit, and a light cutoff part configured to cut off path of light incident on a front of the liquid crystal display panel from a side of the liquid crystal display panel. Accordingly, light leakage caused by light incident on lateral side of liquid crystal display panel by being reflected by mold or light reflected by lateral side of liquid crystal display panel is minimized to output more clear and vivid images.

16 Claims, 17 Drawing Sheets

(56) References Cited

U.S. PATENT DOCUMENTS

| | | | |
|---|---|---|---|
| 7,011,442 B2* | 3/2006 | Okuwaki et al. | 362/626 |
| 7,855,764 B2* | 12/2010 | Okuda | 349/65 |
| 7,973,873 B2* | 7/2011 | Ha et al. | 349/58 |
| 8,154,680 B2* | 4/2012 | Doyle et al. | 349/58 |
| 8,253,875 B2* | 8/2012 | Kim | 349/58 |
| 8,427,598 B2* | 4/2013 | Horie | 349/58 |
| 2010/0029339 A1 | 2/2010 | Kim et al. | |

FOREIGN PATENT DOCUMENTS

| | | |
|---|---|---|
| CN | 101506719 a | 8/2009 |
| WO | WO 2008/023900 A1 | 2/2008 |

* cited by examiner

DISPLAY MODULE AND MOBILE TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2012-027259, Korean Application No. 10-2012-027260, filed on Mar. 16, 2012 and Korean Application No. 10-2012-0044621, filed on Apr. 27, 2012 the contents of which are hereby incorporated by reference herein in their entirety.

BACKGROUND OF THE INVENTION

1. Field of the Invention

The present invention relates to a display module and mobile terminal having the same, and more particularly, to a display panel having a light cutoff part and mobile terminal having the same. Although the present invention is suitable for a wide scope of applications, it is particularly suitable for minimizing light leakage caused by a mold of the display panel.

2. Description of Related Art

Recently, a liquid crystal display is a sort of a flat panel display capable of reducing weight and volume, which are the disadvantages of a conventional CRT (cathode ray tube) monitor, and is gaining popularity.

Generally, a liquid crystal display is a device for displaying an image using optical anisotropy and double refraction of liquid crystal molecules. If an electric field is applied to the liquid crystal display, alignment of liquid crystals is changed. Hence, the liquid crystal display uses an effect that property of light transmittance is changed in accordance with a direction of the changed liquid crystal alignment.

The liquid crystal display is configured in a manner that liquid crystal molecules are inserted between a pair of glass substrates (e.g., color filter layer and transistor layer). The liquid crystal molecules inserted between a pair of the glass substrates are aligned in specific direction in accordance with an externally applied electrical signal, thereby causing dynamic scattering to control intensity of transmitted light.

The liquid crystal display is used as a monitor of a desktop computer, a monitor of an office or home device, or a display unit of a terminal owing to its features of light weight, slim shape, low power consumption driving and the like.

Generally, terminals can be classified into mobile terminals and stationary terminals according to a presence or non-presence of mobility. And, the mobile terminals can be further classified into handheld terminals and vehicle mount terminals according to availability for hand-carry.

A mobile terminal is a device which may be configured to perform various functions. Examples of such functions include data and voice communications, capturing images and video via a camera, recording audio, playing music files and outputting music via a speaker system, and displaying images and video on a display.

Recently, as a liquid crystal display is used for a 3D display screen as well as a 2D display, it becomes more sensitive to a path of light. If the path of light is abnormally bent, however, it may cause a problem of defect to the liquid crystal display.

BRIEF SUMMARY OF THE INVENTION

Accordingly, the present invention is directed to a display module and mobile terminal having the same that substantially obviate one or more problems due to limitations and disadvantages of the related art.

An object of the present invention is to provide a display panel having a light cutoff part and mobile terminal having the same, by which light leakage caused by a mold of the display panel can be minimized.

Technical tasks obtainable from the present invention are non-limited the above mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display module according to one embodiment of the present invention may include a liquid crystal display panel configured to output a desired color per pixel, a backlight unit configured to uniformly project a light to a rear side of the liquid crystal display panel, the backlight unit having a light guide plate and a light source provided next to one side of the light guide plate, a mold assembled with a circumference of the liquid crystal display panel and a circumference of the backlight unit to cover a lateral side of the backlight unit, and a light cutoff part configured to cut off a path of the light incident in front direction from a direction of a sidewall of the liquid crystal display panel.

Preferably, the mold may include a support part configured to have the backlight unit received in a center of the mold, the support part having a top side attached to a circumference of a bottom side of the liquid crystal display panel and a sidewall part configured to extend in front direction to cover a lateral side of the liquid crystal display panel, wherein the light cutoff part has a dark color to absorb light on an abnormal path and wherein the light cutoff part is formed on an inner lateral side of the sidewall part opposite to the lateral side of the liquid crystal display panel.

Preferably, the light cutoff part may include a reflective surface provided between the support part and the lateral side of the backlight unit.

Preferably, the light cutoff part may include an ink layer in dark color formed on a lateral side of the liquid crystal display panel.

Preferably, the liquid crystal display panel may include an upper substrate having an upper transparent electrode and a color filter formed thereon, a lower substrate having a lower transparent electrode formed thereon, and a sealing part formed in dark color between a circumference of the upper substrate and a circumference of the lower substrate, wherein the light cutoff part comprises the sealing part in the dark color.

In another aspect of the present invention, a method of fabricating a display module according to one embodiment of the present invention may include the steps of forming a lower substrate having a lower transparent electrode formed thereon and an upper substrate having an upper transparent electrode and a color filter formed thereon, assembling the upper substrate and the lower substrate together by coating a sealant between the upper substrate and the lower substrate, forming a liquid crystal display panel by injecting liquid crystals between the assembled upper and lower substrates, and coating an ink in dark color on a lateral side of the liquid crystal display panel.

In another aspect of the present invention, a method of fabricating a display module according to another embodiment of the present invention may include the steps of forming a lower substrate having a lower transparent electrode formed thereon and an upper substrate having an upper transparent electrode and a color filter formed thereon, assembling the upper substrate and the lower substrate together by coating a sealant in dark color between the upper substrate and the lower substrate, cutting the assembled lower and upper substrates by a size of an individual liquid crystal display panel along a cutting line, and forming a liquid crystal display panel by injecting liquid crystals between the assembled upper and lower substrates, wherein the sealant in the dark color is coated on a cut part of the individual liquid crystal display panel instead of forming a black matrix on the cut part and wherein in the cutting step, a dark colored sealant coated portion of the cut part without the black matrix is cut for the individual liquid crystal display panel.

In another aspect of the present invention, a mobile terminal according to another embodiment of the present invention may include a front case having a perforated window formed on a front side of the front case, a display module including a liquid crystal display panel configured to output a desired color per pixel, a backlight unit configured to uniformly project a light to a rear side of the liquid crystal display panel, the backlight unit having a light guide plate and a light source provided next to one side of the light guide plate, a mold assembled with a circumference of the liquid crystal display panel and a circumference of the backlight unit to cover a lateral side of the backlight unit, and a light cutoff part configured to cut off a path of the light incident in front direction from a direction of a sidewall of the liquid crystal display panel, and a rear case assembled with the front case to cover a rear side of the display module.

In a further aspect of the present invention, a mobile terminal according to a further embodiment of the present invention may include a front case having a perforated window formed on a front side of the front case, a display module including a liquid crystal display panel assembled with the perforated window to output a desired color per pixel, a backlight unit configured to uniformly project a light to a rear side of the liquid crystal display panel, the backlight unit having a light guide plate and a light source provided next to one side of the light guide plate, a front glass assembled with a front side of the liquid crystal display panel to protect the liquid crystal display panel, a mold assembled with a circumference of the liquid crystal display panel and a circumference of the backlight unit to cover a lateral side of the backlight unit, and a case projection part projected between the mold and the front glass from an inside of the front case light cutoff part, and a rear case assembled with the front case to cover a rear side of the display module.

Accordingly, the present invention provides the following effects and/or features.

First of all, according to one embodiment of the present invention, a display module includes a light cutoff part to minimize light leakage caused by the light incident on a lateral side of a liquid crystal display panel by being reflected by a mold or the light reflected by the lateral side of the liquid crystal display panel, thereby outputting more clear and vivid images.

Secondly, a display module according to another embodiment of the present invention may not include a reflective film of a backlight unit but uses a reflective plane, thereby reducing thickness of the backlight unit.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like.

Figure 1:
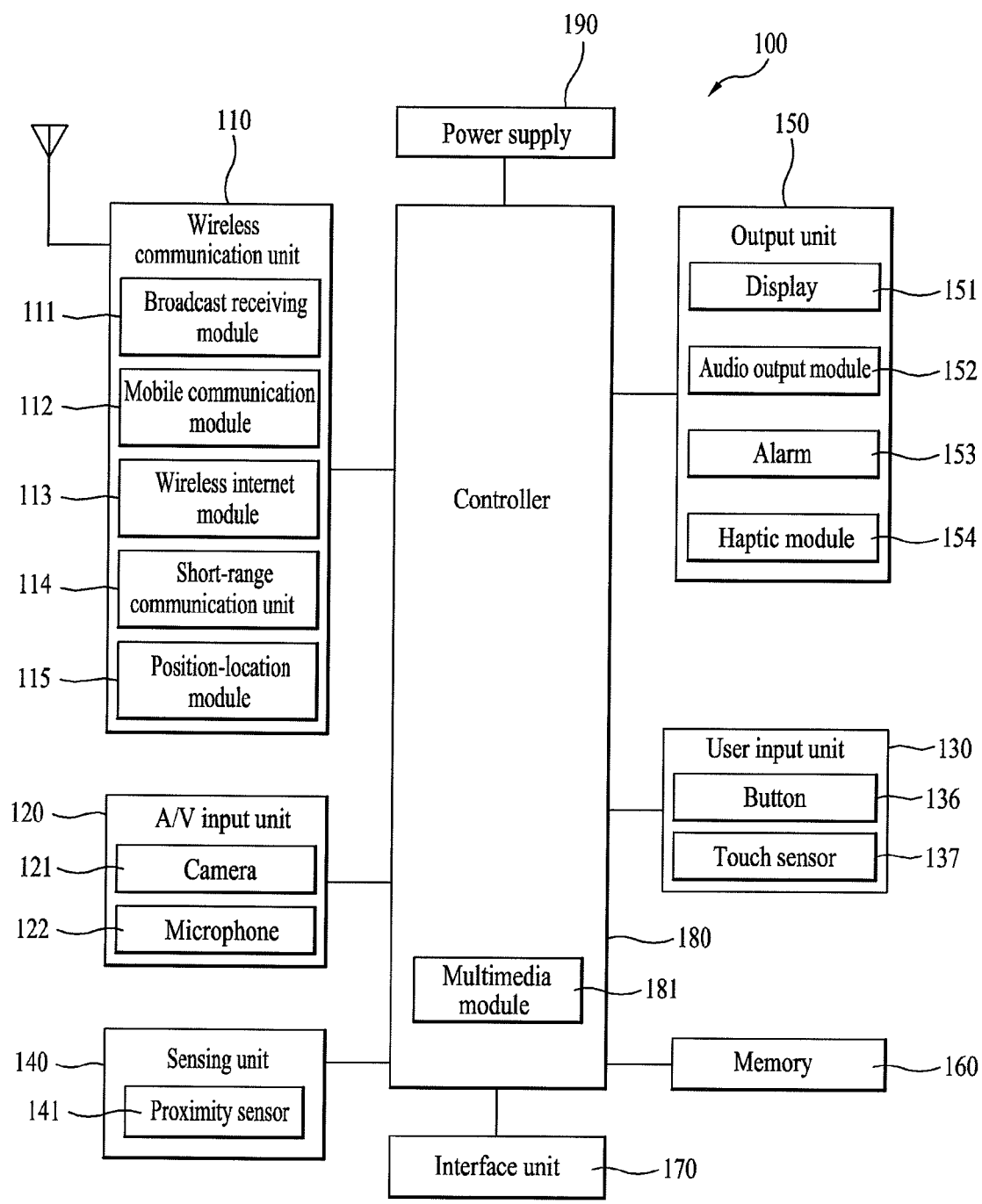
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. For simultaneous receptions of at least two broadcast channels or broadcast channel switching, at least two broadcast receiving modules may be provided to the mobile terminal 100.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-II).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. The user input unit 130 may include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
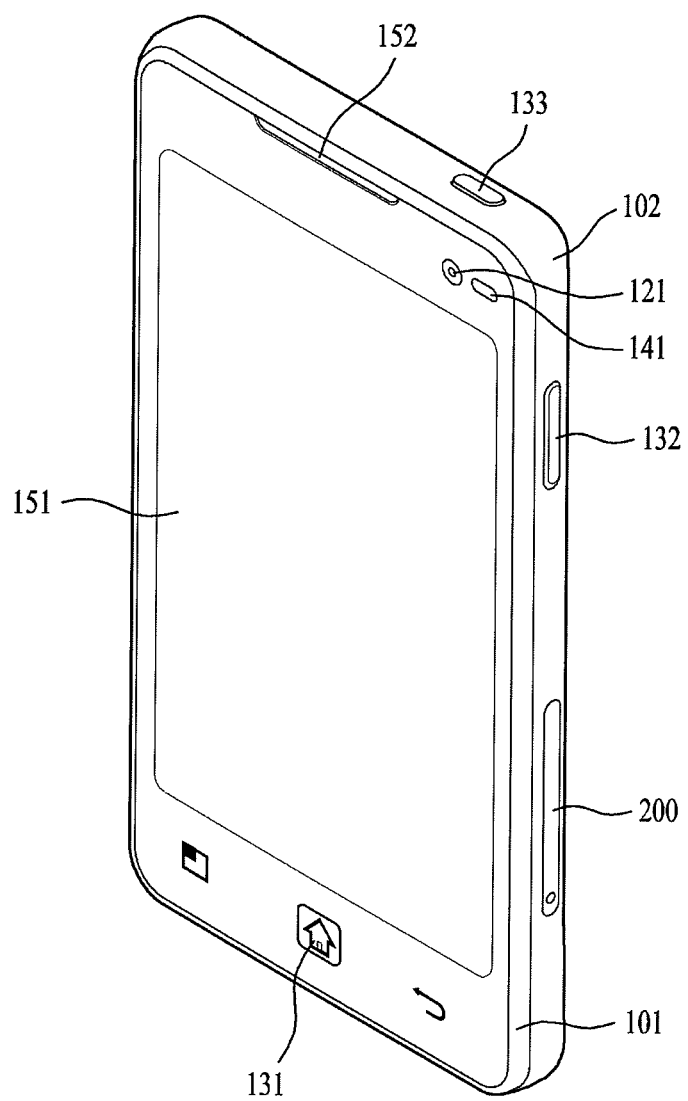
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Figure 3:
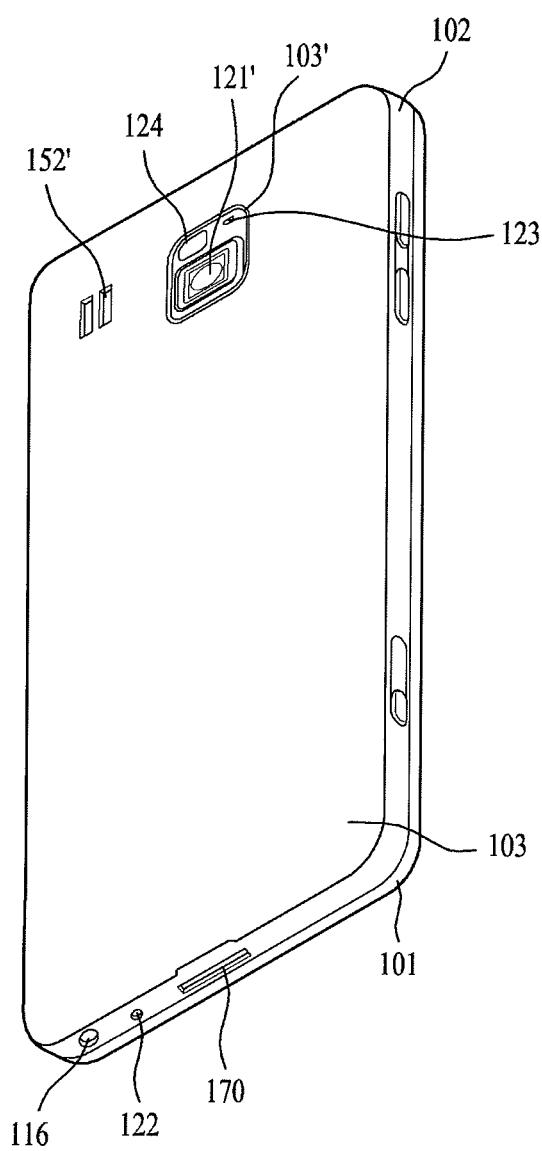
FIG. 3 is a rear perspective diagram of a mobile terminal according to one embodiment of the present invention.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally (as shown in FIG. 3).

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121' has a photographing direction that is substantially opposite to that of the former camera 121 shown in FIG. 2 and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

Figure 4:
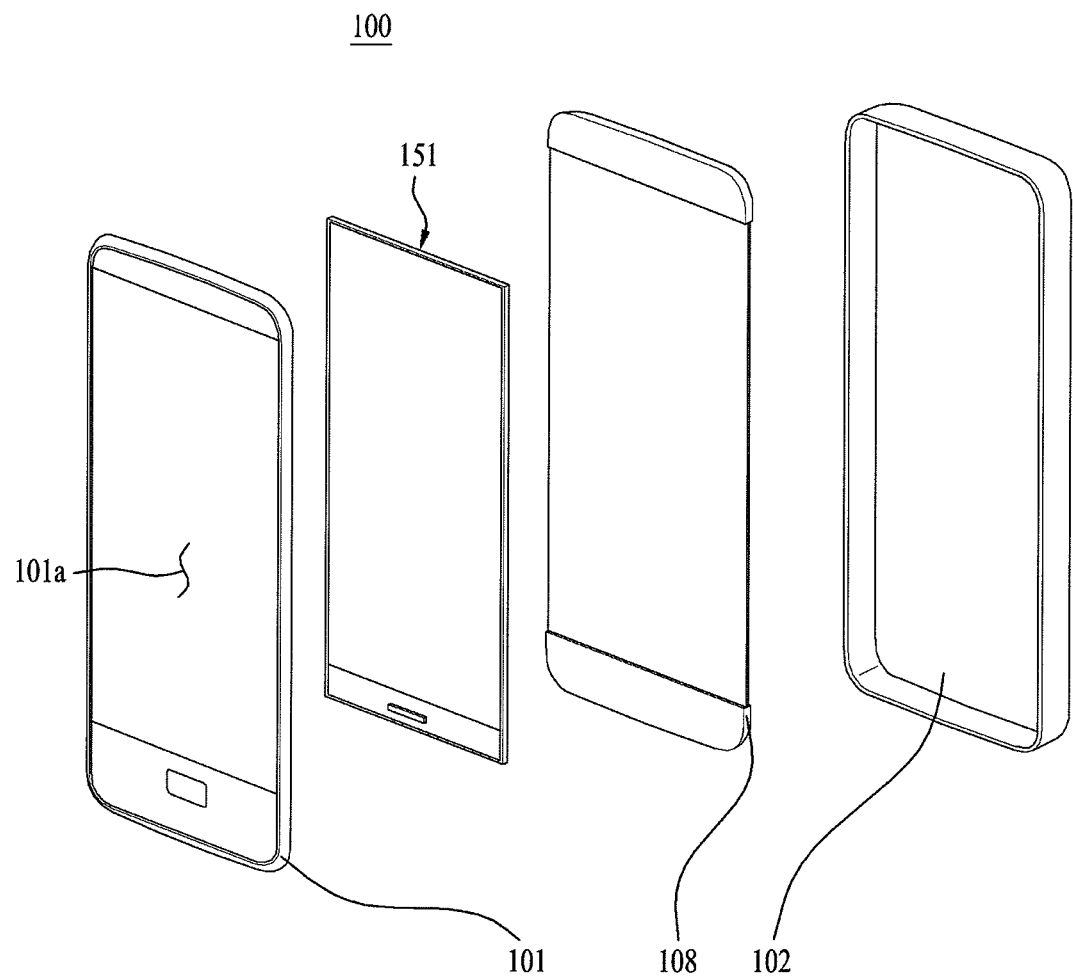
FIG. 4 is an exploded perspective diagram of a mobile terminal according to one embodiment of the present invention.

FIG. 4 is an exploded perspective diagram of a mobile terminal according to one embodiment of the present invention.

Referring to FIG. 4, a mobile terminal 100 according to one embodiment of the present invention may include a case 101 and 102 configuring an exterior of the mobile terminal 100, a display module 151 arranged within the case 101 and 102 to display image information and a frame 108 configured to fix the display module 151 to the case 101 and 102.

As mentioned in the foregoing description, the case 101 and 102 may include a front case 101 and a rear case 102 attached to the front case 101. And, a perforated window 101a may be provided to the front case 101. In particular, the display module 151 is arranged in the perforated window 101a. And, a cover glass 1011 may be provided in a manner of covering the perforated window 101a to protect a front side of the display module 151.

The frame 108 is a member configured to be coupled with the case in order to fix the display module 151 to the perforated window 101a and supports a backside of the display module 151. In particular, the frame 108 is coupled with the case to solidly fix the display module 151 to the perforated window 101a provided to the front side of the case 101. And, the frame 108 may be made of such material as metal, reinforced plastics and the like.

The display module 151 may include a liquid crystal display panel 1510 configured to output color per pixel to provide a user with various images, a backlight unit 1520 configured to supply the liquid crystal display panel 1510 with uniform light, a mold 1530 configured to cover circumferences of the liquid crystal display panel 1510 and the backlight unit 1520, and a light cutoff part 1550, 1553, 1554, 1555, 1556, 1557 or 1558 configured to prevent light leakage.

Compared to the related art display module, the display module 151 of the present invention is characterized in having the light cutoff part 1550, 1553, 1554, 1555, 1556, 1557 or 1558. In particular, the light cutoff part 1550, 1553, 1554, 1555, 1556, 1557 or 1558 is provided to prevent the light leakage. According to the light leakage, a light is incident along a path except a normal path, along which the light is incident of the liquid crystal display panel 1510 from the backlight unit 1520, to affect an image outputted from the display module 151.

Specifically, the object of the present invention is to prevent light leakage from being generated by the light incident on a lateral side of the liquid crystal display panel 1510 by being reflected by the mold 1530 of the lateral side and the light projected to the front side of the liquid crystal display panel 1510 by being reflected by the lateral side of the liquid crystal display panel 1510 among light leakages effects due to various causes. The light incident on the lateral side of the liquid crystal display panel 1010 or the light reflected by the lateral side of the liquid crystal display panel 1510 has an incident angle different from that of the light supplied by the backlight unit 1520, thereby causing distortion of image, brightness difference, stains on screen and the like.

In the following description, a display unit 151 and fabricating method thereof according to another embodiment of the present invention are explained with reference to FIGS. 5 to 15. A display module 151 of the present invention may be usable for such a stationary display device as a TV monitor and the like as well as the aforementioned display module 151 of the mobile terminal 100.

Figure 5:
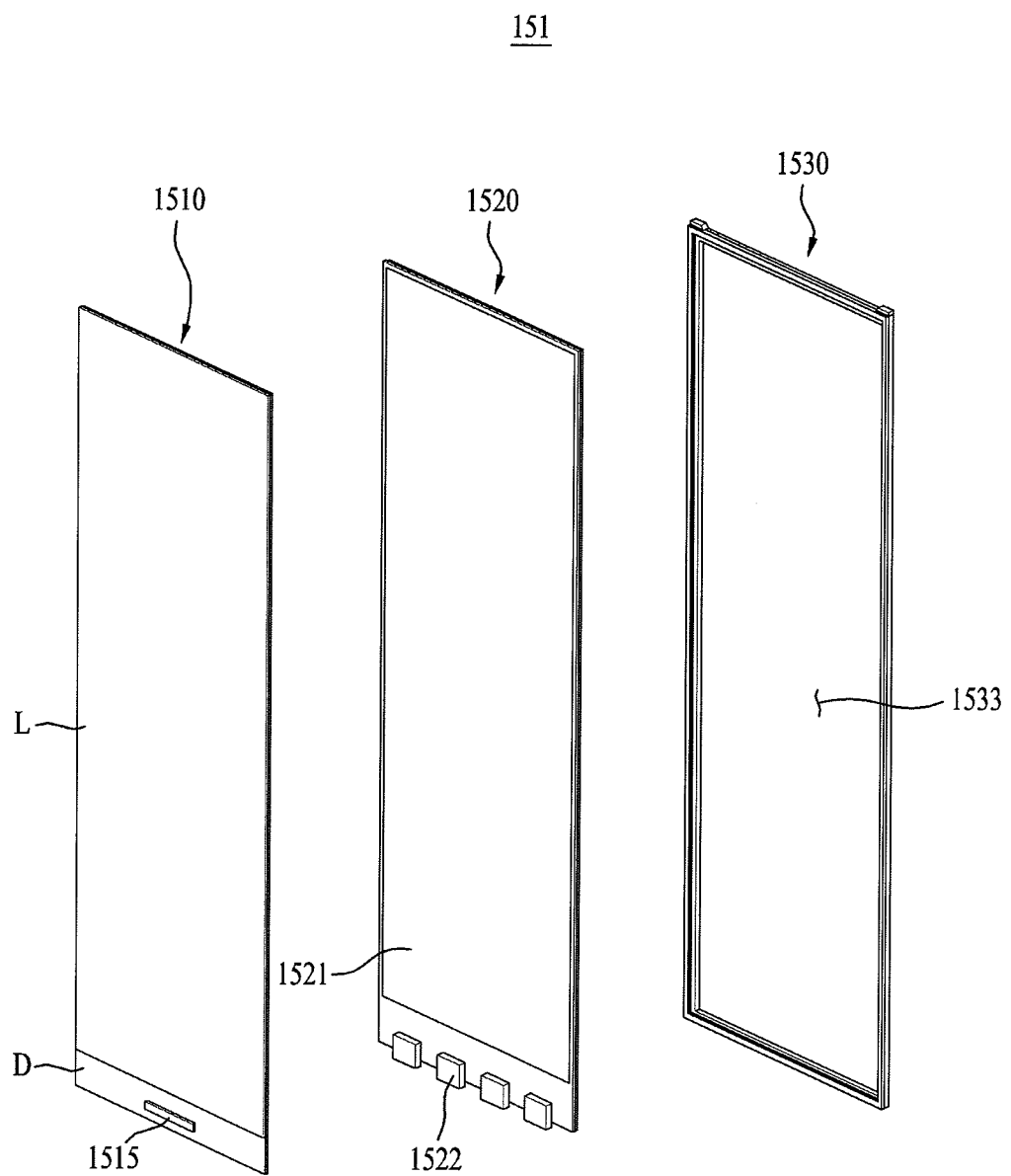
FIG. 5 is an exploded perspective diagram of a display module according to another embodiment of the present invention.

FIG. 5 is an exploded perspective diagram of a display module 151 of the present invention, in which a liquid crystal display panel 1510, a backlight unit 1520 and a mold 1530 are shown.

Referring to FIG. 5, the liquid crystal display panel 1510 is characterized in outputting a desired color per pixel by leading a phase change of liquid crystals in a manner of applying a signal to a transistor. The liquid crystal display panel 1510 may include a pair of transparent substrates 1511 and 1512 and a liquid crystal layer 1514 provided between a pair of the transparent substrates 1511 and 1512.

A transparent upper electrode is formed on the upper substrate 1511 and a transparent lower electrode is formed on the lower substrate 1512. A color filter may be included in the upper substrate 1511 to display colors and may be called a color filter layer. If alignment of liquid crystals is changed by controlling voltages applied to the upper and lower electrodes, light supplied from the backlight unit 1520 in rear can be selectively transmitted.

The backlight unit 1520 is situated under the liquid crystal display panel 1510, plays a role in uniformly supplying light toward the liquid crystal display panel 1510, and mainly includes a light guide plate 1521 and a light source 1522 configured to supply light to the light guide plate 1521.

The light guide plate 1521 is made of transparent material. For example, the light guide plate 1521 may include a transparent acryl panel. In order to evenly supply the light supplied from the light source 1522 to a whole surface of the liquid crystal display panel 1510, various kinds of patterns may be formed on a surface of the light guide plate 1521. One of a prism film, a reflective film 1523 and the like may be attached to the surface of the light guide plate 1521.

The light source 1522 supplies the light to the light guide plate 1521. For instance, an LED type light source 1522 is shown in FIG. 5. Of course, various types of light sources may be applicable to the light source 1522. The light source 1522 is located next to a lateral side of the light guide plate 1521, by which a location of the light source 1522 may be non-limited. Alternatively, the light source 1522 may be provided to various locations.

The mold 1530 may include a support part 1531 configured to have the backlight unit 1520 loaded on a center of the mold 1530 and to have its top side coupled with a bottom circumference of the liquid crystal display panel 1510 and a sidewall part configured to extend in front direction from the support part 1531 to cover the lateral side of the liquid crystal display panel 1510.

Figure 6:
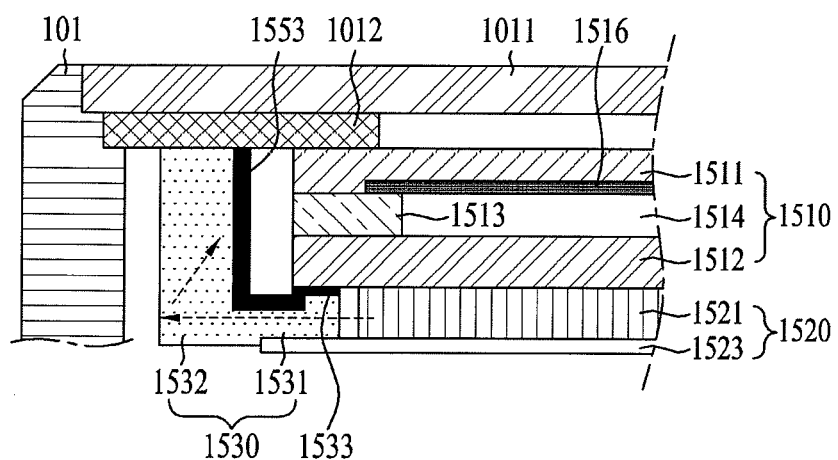
FIG. 6 is a cross-sectional diagram for a 1st example of a display module according to another embodiment of the present invention.

FIG. 6 is a cross-sectional diagram for a 1st example of a display module according to another embodiment of the present invention.

Referring to FIG. 6, the support part 1531 of the mold 1530 surrounds a circumference of the backlight unit 1520. A top side of the support part 1531 fixes the backlight unit 1520 and the liquid crystal display panel 1510 thereto by coming in contact with a bottom circumference of the liquid crystal display panel 1510.

Moreover, the top side of the support part 1531 and the liquid crystal display panel 1510 is attached together using an adhesive pad in dark color or an adhesive agent 1533, thereby preventing light from leaking via the coupled part of the mold.

The sidewall part 1532 extending in front direction from the support part 1531 to cover the lateral side of the liquid crystal display panel 1510 plays roles in protecting the lateral side of the backlight unit 1520 and supporting the force pressurized by a glass 1011 in front.

When an external shock is applied, it may be necessary to buffer the shock. To this end, a buffer pad 1012 made of elastic substance may be further provided between the mold 1530 and the front glass 1011. In the drawing, the glass 1011 is situated on the top side of the mold 1530. Alternatively, an end portion of the case 101 may be situated on the mold 1530.

Since the mold 1530 is configured to cover the lateral side of the backlight unit 1520, light may be projected via a lateral side of the pad support part 1531 from the lateral side of the backlight unit 1520.

Figure 25:
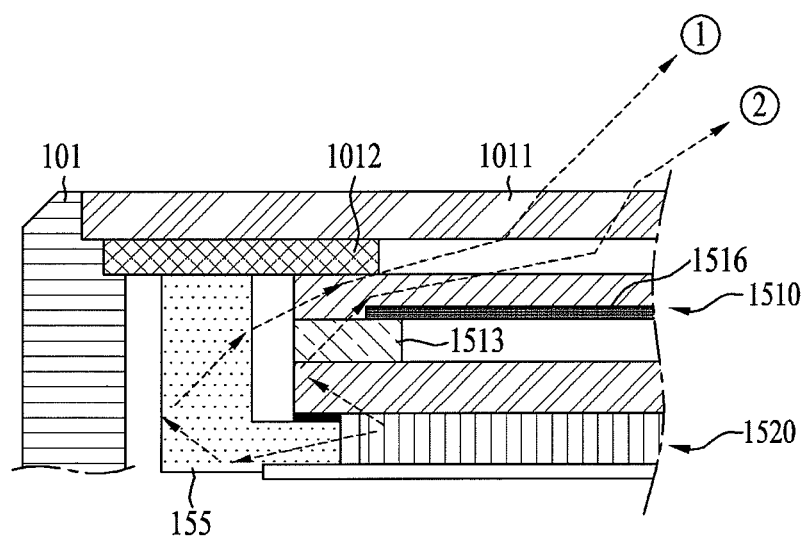
FIG. 25 and FIG. 26 are cross-sectional diagrams of a display panel according to a related art to explain a light leakage effect of a display module.
Figure 26:
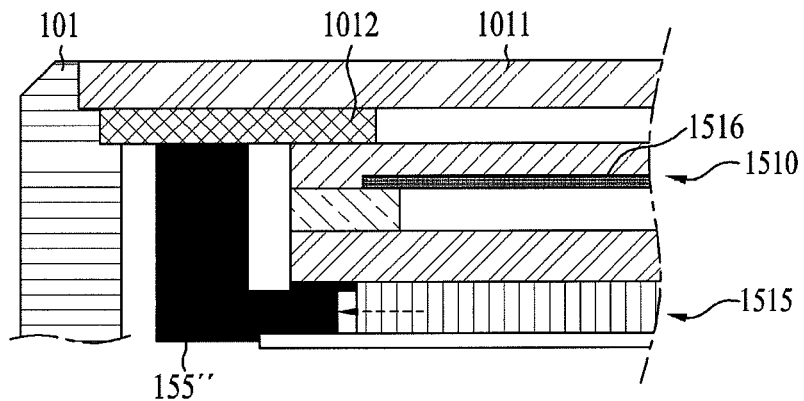

Yet, since the mold 1530 generally uses an injection molded object in such bright color as white and the like, light leakage may be generated. FIG. 25 and FIG. 26 are cross-sectional diagrams of a display panel according to a related art to explain a light leakage effect of a display module. Referring to FIG. 25, light projected from the lateral side of the backlight unit 1520 is incident on the mold 155 in bright color, is reflected within the mold 155, and is then incident on the lateral side of the liquid crystal display panel 1510, which is called a light leakage effect ①.

In order to prevent this light leakage effect, it may be necessary to cut off the light not to be incident on the mold 155. And, it may be also necessary to cut off the light incident on the mold 155 not to be incident on the liquid crystal display panel 1510 again.

Referring to FIG. 26, if a mold 155" is entirely formed in black, a light projected from the lateral side of the backlight unit is absorbed in the mold 155" and is not projected toward the liquid crystal display panel 1510. Yet, it may still cause a problem that the light reflected again by the support part of the mold 155" to the backlight unit 1520 is absorbed as well. In particular, it may cause the problem that luminance of the display module 151 is lowered.

In the following description, a display module 151 including a light cutoff part 1553, 1554, 1555 or 1556, which is configured to prevent a light leakage effect caused by a light incident on a lateral side of a liquid crystal display panel 1510 via a mold without lowering luminance of the display module 151, according to the present invention is explained.

FIGS. 6 to 19 are diagrams of 1st to 7th examples of a display module 151 according to the present invention, in which the 1st to 7th examples are identical to each other in the basic configurations of the liquid crystal display panel 1510, backlight unit 1520 and mold 1530 mentioned in the foregoing description. Yet, light cutoff parts 1553, 1554, 1555 and 1556 of the 1st 7th examples differ from each other in position, shape, material and color.

The 1st example of the display module 151 is described with reference to FIG. 6 as follows.

Referring to FIG. 6, the light cutoff part 1553 of the 1st example includes a dark part (e.g., a part in black, etc.) having a surface of the sidewall part 1532 of the mold 1530 opposite to the lateral side of the liquid crystal display panel 1510. In case that a top side of the support part 1531 is partially exposed toward a lateral side of the liquid crystal display panel 1510, the exposed portion is formed in dark color to be included in the light cutoff part 1553.

According to the present example, the light incident on the mold 1530 is not cut off but the light reflected by an inside of the mold 1530 toward the liquid crystal display panel 1510 is cut off.

Figure 13:
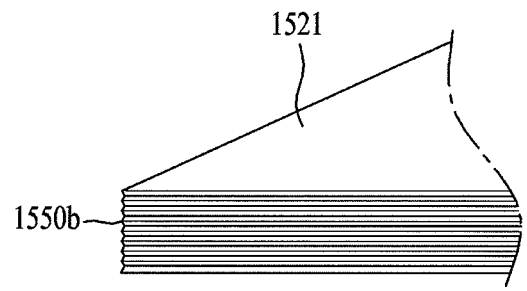
Figure 14:
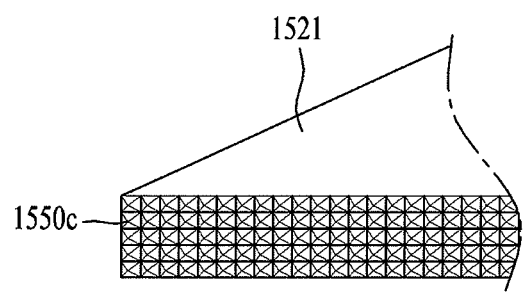

Unlike the related art mold 1530 entirely formed in black, as shown in FIG. 13, since the light reflected by the support part 1531 is maintained as it is, it may be able to prevent the light leakage without lowering the luminance of the display module 151.

As one of methods of fabricating the mold 1530 partially formed in different colors, there is a double injection molding. According to the double injection molding, two kinds of injectants are injected to form an injection molded object partially differing in material or color.

In particular, the mold 1530 shown in FIG. 6 may be provided in a manner that an inner lateral side of the sidewall part 1532 is injection molded in dark color only to form the light cutoff part 1553 and that the rest is injection molded in bright color.

The 2nd example of the display module 151 is described with reference to FIG. 7 as follows.

Figure 7:
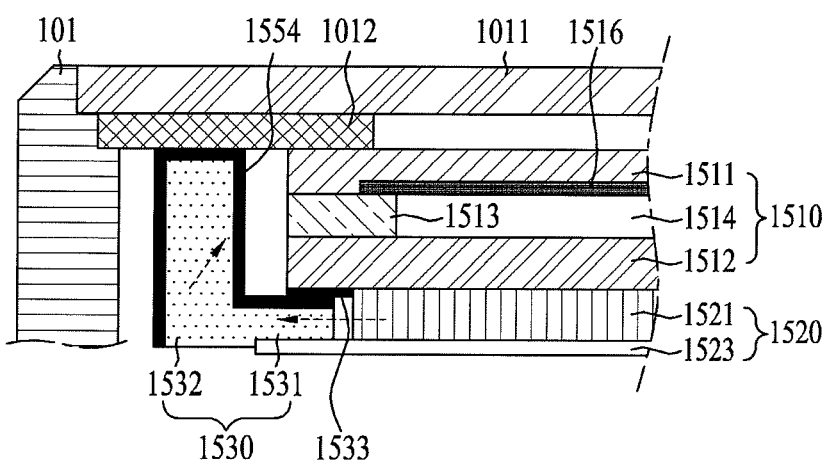
FIG. 7 is a cross-sectional diagram for a 2nd example of a display module according to another embodiment of the present invention.

Referring to FIG. 7, the light cutoff part 1554 of the 2nd example may be configured in a manner that top and outer lateral sides of the sidewall part 1532 are covered with dark color as well as an inner lateral side of the sidewall part 1532 while a surface opposite to a lateral side of the light guide plate 1521 of the backlight unit 1520 may formed in bright color to prevent reduction of luminance.

Although the 2nd example may be performed by the above-described double injection molding, it may be performed in a manner that an ink in dark color is coated on a surface of the mold 1530 in part. In particular, the surface opposite to the liquid crystal display panel 1510 of the sidewall part 1532 may be coated with ink only, as shown in FIG. 6. Alternatively, both of the top side and the outer lateral side of the sidewall part 1532 may be coated with dark ink as well as the inner lateral side of the sidewall part 1532, as shown in FIG. 7.

Figure 8:
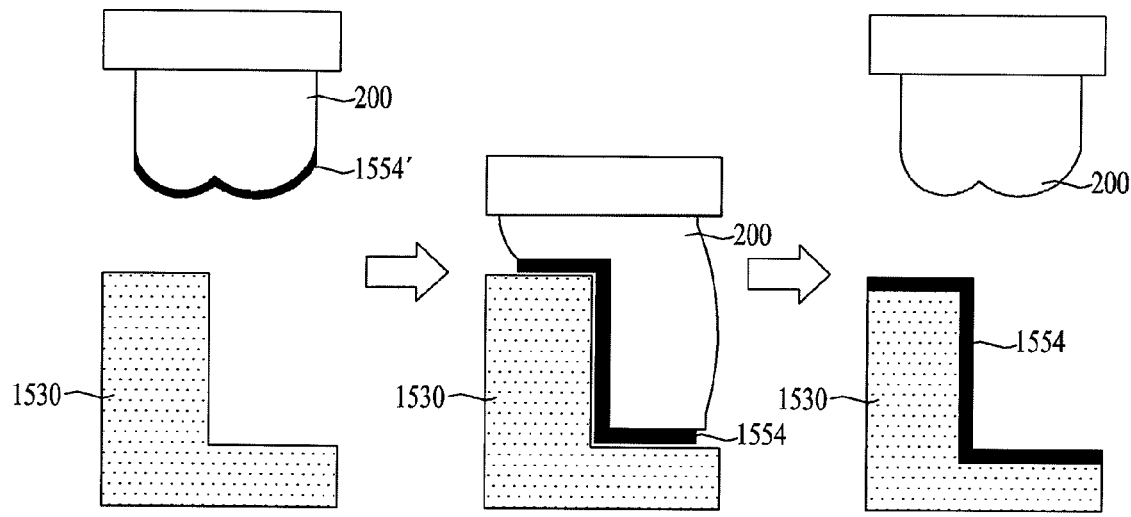
FIG. 8 is a diagram for a flow of fabricating a 2nd example of a display module according to another embodiment of the present invention.

FIG. 8 is a diagram for an example of an ink coating method, in which pad printing is shown.

Referring to FIG. 8, the light cutoff part 1554 may be formed in a manner that a pad 200 of an elastic substance such as silicon, rubber and sponge is covered with ink 1554' and that the ink covered pad 200 is printed on the mold 1530.

The 3rd and 4th examples of the display module 151 are described with reference to FIG. 9 and FIG. 10, respectively.

Figure 9:
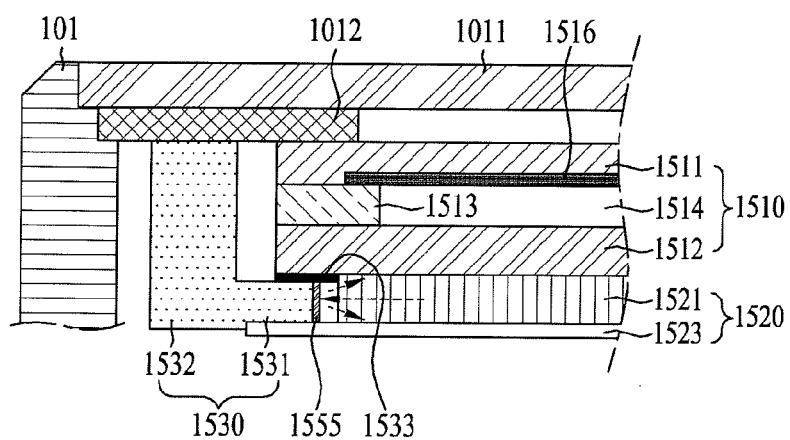
FIG. 9 is a cross-sectional diagram for a 3rd example of a display module according to another embodiment of the present invention.

FIG. 9 is a cross-sectional diagram for a 3rd example of a display module according to another embodiment of the present invention. And, FIG. 10 is a cross-sectional diagram for a 4th example of a display module according to another embodiment of the present invention.

Figure 10:
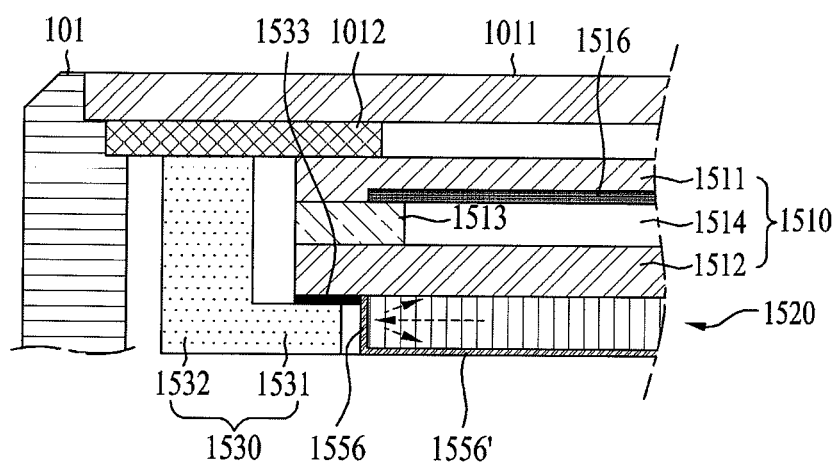
FIG. 10 is a cross-sectional diagram for a 4th example of a display module according to another embodiment of the present invention.

Referring to FIG. 9 and FIG. 10, the light cutoff part 1555/1556 of the present example includes a reflector inserted between a lateral side of the light guide plate 1521 of the backlight unit 1520 and a lateral side of the support part 1531 opposite to the lateral side of the light guide plate 1521. In the 3rd example shown in FIG. 9, the light cutoff part 1555 includes the reflector provided to the lateral side of the support part 1531 of the mold 1530. In the 4th example shown in FIG. 10, the light cutoff part 1556 includes the reflector provided to the lateral side of the backlight unit 1520. The reflector 1555/1556 is advantageous in minimizing loss of light in a manner of entirely cutting off and reflecting the light incident on the mold 1530 from the backlight unit 1520.

Alternatively, referring to FIG. 10, a reflective surface 1556' can be formed on a bottom surface of the backlight unit 1520 as well as a lateral side of the backlight unit 1520. In case that the reflective surface is formed on the bottom side of the backlight unit 1520, it may be able to omit a reflective sheet attached to a bottom surface of the light guide plate 1521.

The reflective surface of the 3rd or 4th example may be formed by one of a method of printing mirror ink, a method of depositing such light reflective metal as AG and the like, a method of attaching a metal film of a tape type and the like. The reflective surface formed by one of the above methods has a small thickness, thereby reducing an overall thickness of the backlight unit 1520 compared to a reflective film 1523 attached to a backside of the light guide plate 1521.

Figure 11:
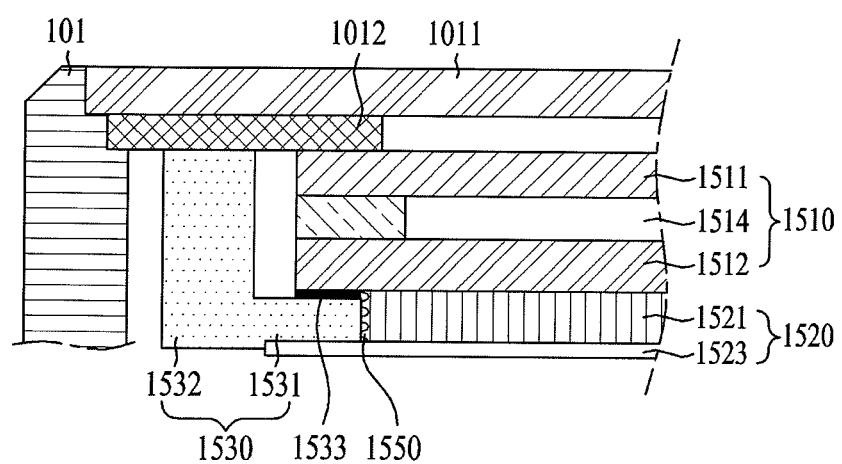
FIG. 11 is a cross-sectional diagram for a 5th example of a display module according to another embodiment of the present invention.

Alternatively, according to the display module of the 5th example shown in FIG. 11, a scattered reflection pattern is formed on a lateral side of the light guide plate 1521, thereby cutting off light incident on the mold 1530 in a manner of scattering light incident on the lateral side of the light guide plate 1521.

Figure 12:
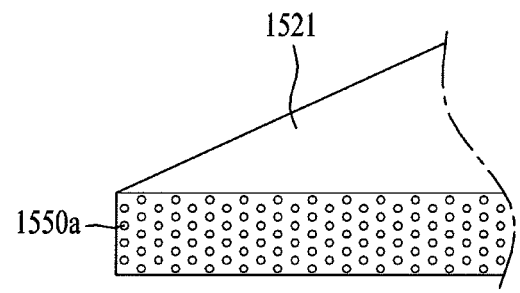
FIGS. 12 to 14 are perspective diagrams of a lateral view of a light guide plate shown in FIG. 11.

The scattered reflection pattern 1550 may be configured to have a dot pattern 1550*a* of a hemispherical shape, as shown in FIG. 12. In particular, the dot pattern 1550*a* may be embossed or engraved. It may not be mandatory for the dot pattern 1550*a* to have the hemispherical shape in a predetermined size. Alternatively, the dot pattern 1550*a* may include a plurality of hemispherical projections or recesses in various sizes.

Referring to FIG. 13, it may be able to form a serration pattern 1550*b* as the scattered reflection pattern 1550. In the serration pattern 1550*b*, v-shaped unevenness is repetitively formed by configuring peaks and valleys. Height and size of each of the peaks and valleys may be formed uniformly or irregularly. Alternatively, referring to FIG. 14, the scattered reflection pattern 1550 may include a pyramid pattern configured with unevenness of a pyramid shape 1550*c*.

Figure 15:
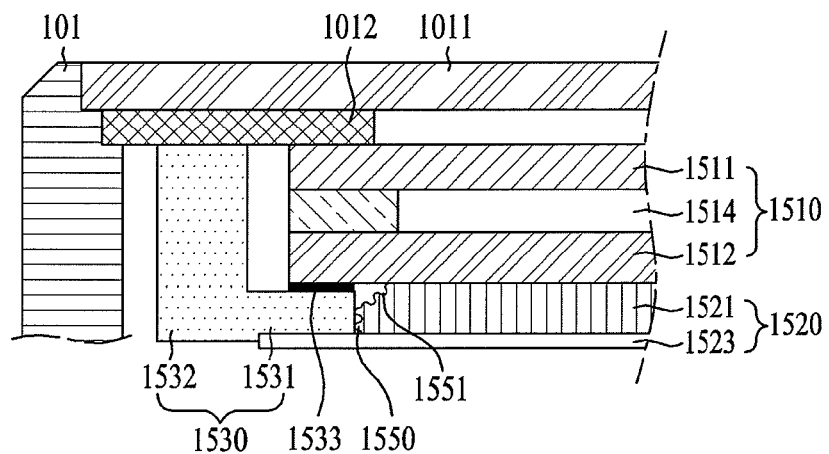
FIG. 15 is a cross-sectional diagram for a 6th example of a display module according to another embodiment of the present invention.

Referring to FIG. 15, in a display module according to a 6th example, the light guide plate may include an inclining surface 1551. If the inclining surface 1551 is formed or an upper circumference of the light guide plate 1521, i.e., between a lateral side and a top side of the light guide plate 1521, a size of the lateral side of the light guide plate 1521 can be reduced. Therefore, it may be able to reduce the light incident on the mold 1530. As the light may smear into the mold 1530 via the inclining surface 1551, a scattered reflection pattern 1550 may be formed on the inclining surface 1551 as well.

Figure 16:
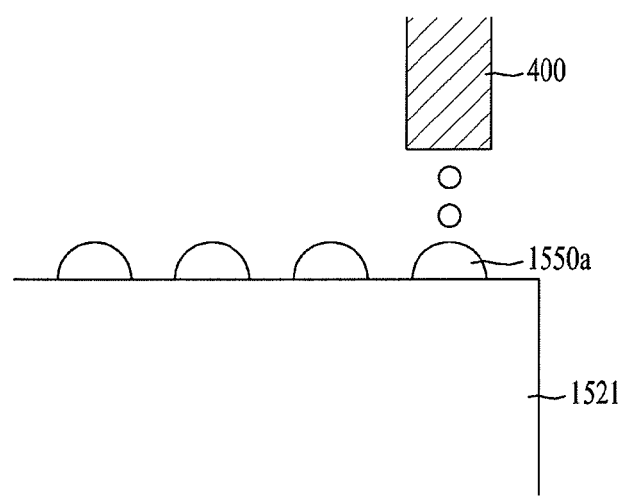
FIG. 16 is a diagram for a method of forming a scattered reflection pattern of a light guide plate shown in FIG. 11 according to one embodiment of the present invention.

Referring to FIG. 16, this scattered reflection pattern 1550 may be formed by such a printing method as an ink jet method and the like using an ink jet printer 400. The light is scattered and reflected toward the light guide plate 1521 by the corresponding pattern, whereby the light leakage effect can be prevented.

Figure 17:
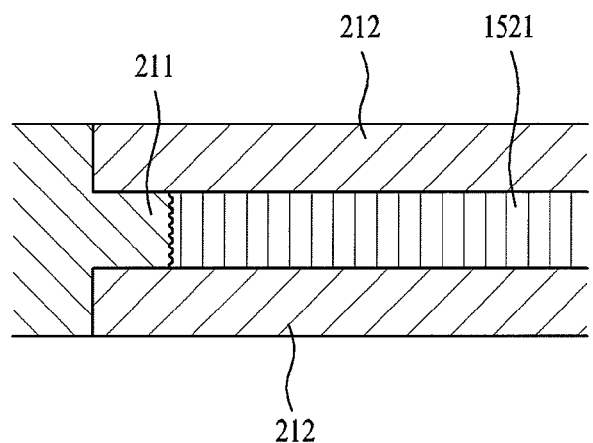
FIG. 17 and FIG. 18 are diagrams for a method of forming a scattered reflection pattern of a light guide plate shown in FIG. 11 according to another embodiment of the present invention.
Figure 18:
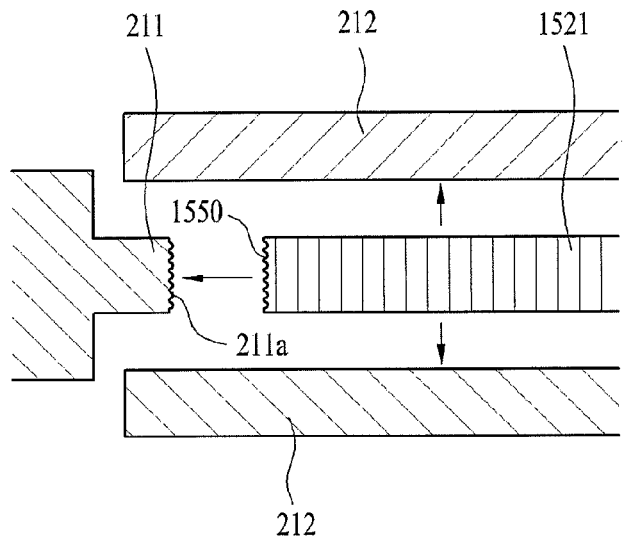

Referring to FIG. 17 and FIG. 18, it may be able to fabricate a scattered reflection pattern using a split mold. In particular, according to the split mold, when injection molding is performed, several frames are assembled together to form one mold. And, an injection molded object is then obtained by dissembling the mold into the several frames again.

Since a pattern for leading light to be incident on a liquid crystal display panel in front and a scattered reflection pattern 1550 on a lateral side are provided to front and rear sides of the light guide plate 1521, it may be difficult to form the scattered reflection pattern 1550 on the lateral side using a mold 212 configured with a top side and a bottom side only. Hence, a frame 211 assembled laterally is further required as well as the frames 212 of the top and bottom sides. In particular, the light guide plate of the present invention can be fabricated by a split mold including a lateral frame having a pattern 211*a* formed thereon to correspond to the scattered reflection pattern 1550.

A surface illumination intensity of the scattered reflection pattern 1550 may be increased by processing the lateral side of the light guide plate 1521 with laser. In particular, since the laser processing enables surfaces of various shapes, it may be able to form the scattered reflection pattern 1550 having one of various shapes including the dot pattern 1550*a*, the serration pattern 1550*b*, the pyramid pattern 1550*c* and the like.

Figure 19:
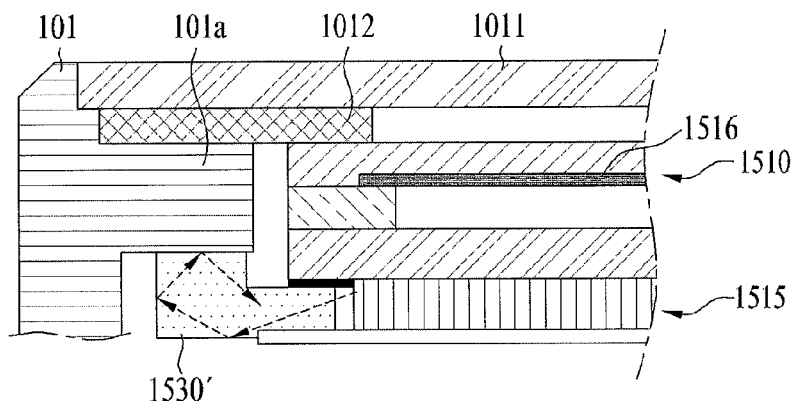
FIG. 19 is a cross-sectional diagram for a 7th example of a display module according to another embodiment of the present invention.

Referring to FIG. 19, in a display module according to a 7th example, a sidewall part may be omitted from a mold 1530' and a support part may be included only. As a light incident on the mold 1530' is not incident on a lateral side of the liquid crystal display panel 1510, it may be able to cut off the light incident on the lateral side of the liquid crystal display panel 1510 by removing a structure that causes a problem of the light leakage effect.

Yet, as the mold 1530' does not have a sidewall part for covering the lateral side of the liquid crystal display panel 1510, it may have difficulty in distributing a force applied to the liquid crystal display panel 1510. Therefore, it may be probable that the liquid crystal display panel 1510 may be broken or damaged by an external shock.

To prevent such a breakage or damage, a case projection part 101*a* may be further provided to a lateral side of the case 101. If the case projection part 101*a* is placed between a top side of the mold 1530' and the front glass 1011, the function of protecting the liquid crystal display panel 1510, which was taken charge of by the sidewall part 1532 of the mold 1530 shown in FIG. 6, can be performed by the case projection part 101*a*. As there is a boundary between the case projection part 101*a* and the mold 1530', a path of light incident on the mold 1530' is primarily cut off. As the case projection part 101*a* is built in one body of the case 101, it does not have a surface for reflecting light toward the liquid crystal display panel again. Therefore, it may be able to prevent the light from being incident on the lateral side of the liquid crystal display panel 1510.

The case provided with the above-described mold 1530' and projection part 101*a* may be additionally applicable if the reflector 1555/1556 or the scattered reflection pattern 1550 is formed on the light guide plate according to the aforementioned 3rd to 6th examples.

As mentioned in the foregoing description, if light is incident on a lateral side of the liquid crystal display panel 1510 from the mold 1530, light leakage is generated. Moreover, in case that the light reflected by the lateral side of the liquid crystal display panel 1510 is projected toward a front side of the display panel, as shown in FIG. 25, a light leakage effect ② is generated.

In particular, since the lateral side of the liquid crystal display panel 1510 comes in contact with air to have a refractive index, the light incident on the lateral side of the liquid crystal display panel 1510 is reflected thereby to generate the light leakage effect ②.

In the following description, a display module having a light cutoff part 1557/1558, which is configured to prevent light leakage generated by a light reflected by a lateral side of the liquid crystal display panel 1510, and fabricating method thereof are explained with reference to FIGS. 20 to 24.

Figure 20:
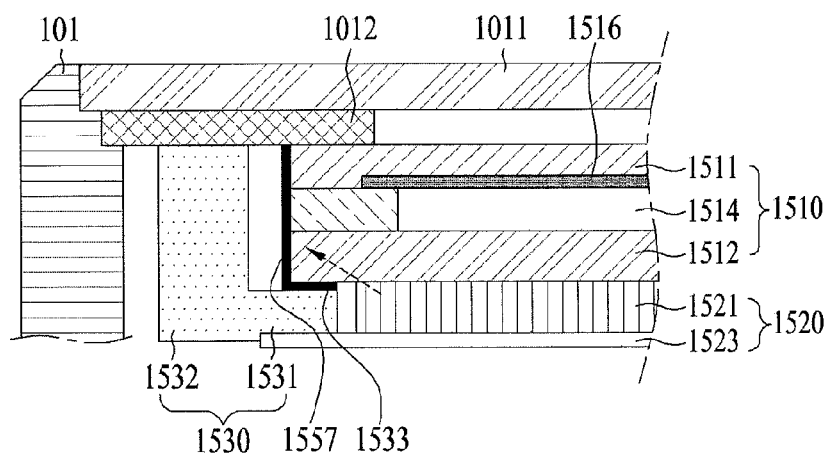
FIG. 20 is a cross-sectional diagram for an 8th example of a display module according to another embodiment of the present invention.

FIG. 20 is a cross-sectional diagram for an 8th example of a display module 151 according to another embodiment of the present invention.

Referring to FIG. 20, a light cutoff part 1557 in dark color is provided to a lateral side of a liquid crystal display panel 1510. In particular, the light cutoff part 1557 is formed in dark color to absorb light incident on the lateral side of the liquid crystal display panel 1510 instead of reflecting the incident light.

Since a thickness of the lateral side of the liquid crystal display panel 1510 is very small, it may be difficult to attach a film to the lateral side of the liquid crystal display panel 1510. Hence, a printing method is preferably used. There are various kinds of the printing methods using ink. Yet, if a force is applied to the thin lateral side of the liquid crystal display panel 1510, it is highly probable that the liquid crystal display panel 1510 may be broken or damaged. Therefore, an ink jet printing method may be usable to apply less force to the lateral side of the liquid crystal display panel 1510.

In the following description, a method of fabricating the display module 151 including the light cutoff part 1557 shown in FIG. 20 is explained with reference to FIG. 21.

Figure 21:
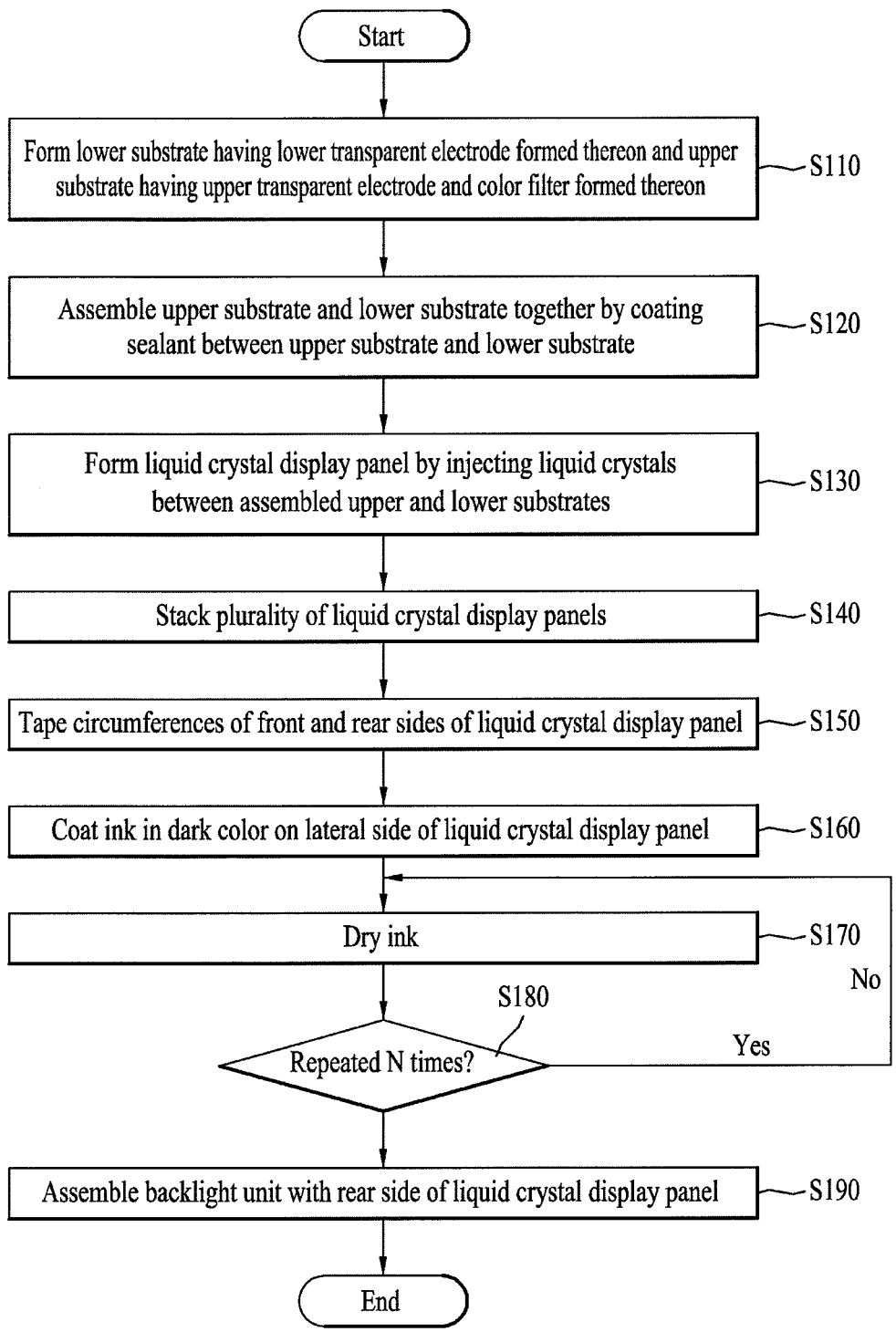
FIG. 21 is a flowchart for a method of fabricating the display module shown in FIG. 20 according to one embodiment of the present invention.

FIG. 21 is a flowchart for a method of fabricating the display module shown in FIG. 20 according to one embodiment of the present invention.

Referring to FIG. 21, an upper substrate 1511 and a lower substrate 1512 are prepared.

A lower transparent electrode is formed on the lower substrate 1512 and an upper electrode and a color filter are formed on the upper substrate 1511 [S110]. Each of the upper substrate 1511 and the lower substrate 1512 includes the transparent electrode mentioned in the foregoing description. In particular, a transparent electrode pattern is formed in a manner of depositing an ITO film on a glass substrate and then selectively removing the ITO film using a photo sensitizer.

A sealant is coated between the upper substrate 1511 and the lower substrate 1512 to attach the upper substrate 1511 and the lower substrate 1512 to each other [S120].

In particular, since the sealant is coated on a circumference of an individual panel, it may be coated by screen printing. In doing so, a spacer may be inserted between the two substrates 1511 and 1512 to have the upper and lower transparent electrodes electrically connected together or to maintain a space between the upper substrate 1511 and the lower substrate 1512. In this case, the spacer for maintaining the space is dispersed between the upper substrate 1511 and the lower substrate 1512 to enable the space between the two substrates 151 and 1512 to be uniformly maintained.

A sealing part 1513 is formed in a following manner. First of all, the upper substrate 1511 and the lower substrate 1512 are aligned and attached together using the sealant. Secondly, the sealant is then hardened by applying a predetermined pressure at a predetermined temperature thereto. In doing so, in case that a plurality of liquid crystal substrates are simultaneously formed, a step of cutting them by a size of an individual liquid crystal display panel 1510 is additionally required.

Subsequently, a liquid crystal display panel 1510 is formed in a manner that liquid crystals are injected between the upper substrate 1511 and the lower substrate 1512 attached together [S130]. In doing so, liquid crystals may be injected via a liquid crystal inlet by one of various methods. Generally, the liquid crystals are injected in a manner of vacuumizing the space between two substrates and then enabling liquid crystals to be sucked into the space by a corresponding pressure difference. After the liquid crystals have been injected, the liquid crystal inlet is sealed to complete the liquid crystal display panel 1510.

Thereafter, a light cutoff part 1557 is formed in a manner that a lateral side of the liquid crystal display panel 1510 is coated with an ink in dark color [S160]. As the ink coating method, there is screen printing, stamping or the like. Yet, the ink may permeate into the liquid crystal display panel 1510 or the liquid crystal display panel 1510 may be broken or damaged by a prescribed pressure. In order to prevent the ink permeation or the breakage/damage, the lateral side of the liquid crystal display panel 1510 may be coated with an ink using a digital printer by ink jet.

Moreover, in order to reduce an ink coating time and to minimize the breakage or damage of the liquid crystal display panel 1510, a plurality of liquid crystal display panels 1510 are stacked on each other [S140] and ink may be the coated on the stacked liquid crystal display panels 1510 simultaneously. Moreover, in order to prevent the ink from being coated on the rest region except the lateral side of the liquid crystal display panel 1510, at least one of front and rear sides of the liquid crystal display panel 1510 may be protected using a tape attached thereto [S150].

Subsequently, the coated ink is dried [S170]. In doing so, in order to dry the ink, i.e., to harden the ink, heat is applied thereto. Preferably, this step S170 may be performed in a temperature range of 60° C. to 70° C. Since a state of ink may be changed at a temperature over 70° C., the thermal hardening may be performed at a temperature below 70° C. In order to completely cut off the light leakage, the light cutoff part 1557 needs to have a sufficient thickness. Therefore, the ink is repeatedly coated and dried [S180]. According to tests, the light leakage is cut off if the coating and drying is performed at least 4 times.

After the ink has been coated, the coated ink is left alone for predetermined duration, e.g., 24 hours to be completely hardened. Thereafter, a display module is configured in a manner of installing the backlight unit 1520 on a backside of the liquid crystal display panel 1510 and assembling them with a mold [S190].

The above-fabricated display module minimizes the light leakage caused by the light reflected by the lateral side of the liquid crystal display panel 1510, thereby outputting more vivid and clear images. Moreover, the above-described display module may be available for a mobile terminal and various kinds of devices equipped with display units.

Figure 22:
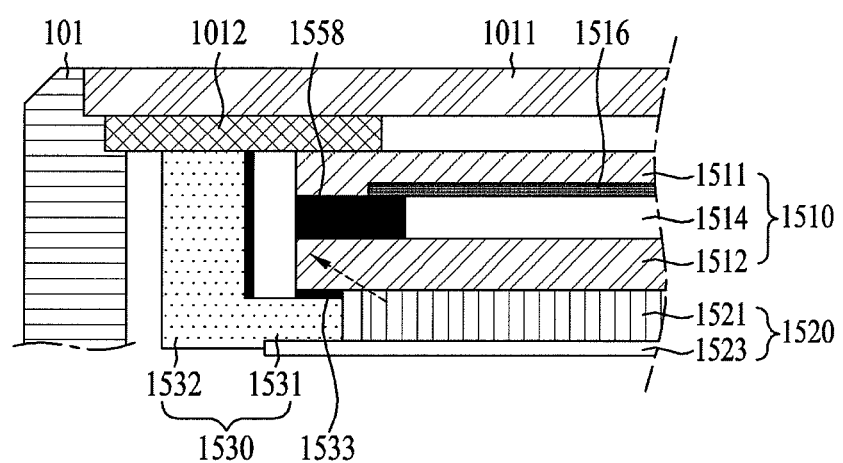
FIG. 22 is a cross-sectional diagram for a 9th example of a display module according to another embodiment of the present invention.

FIG. 22 is a cross-sectional diagram for a 9th example of a display module 152 according to another embodiment of the present invention.

Referring to FIG. 22, a 9th example of a display module 152 according to another embodiment of the present invention is characterized in that a light cutoff part 1558 includes a black sealing part 1513 situated between an upper substrate 1511 and a lower substrate 1512 of a liquid crystal display panel 1510.

A part of a black matrix 1516 formed on a color filter of the upper substrate 11 is formed in dark color to absorb light. If the black matrix 1516 is configured to extend to an edge of the liquid crystal display panel 1510, it may be able to cut off most of the light reflected by a lateral side of the lower substrate 1512 or the light reflected by the sealing part 1513. Therefore, a light leakage effect can be prevented.

Since a size of the liquid crystal display panel 1510 used for a mobile terminal is small, several modules are simultaneously fabricated and then separated into individual modules. If the black matrix 1516 is formed to the edge of the liquid crystal display panel 1510 to prevent the light reflection on the lateral side of the liquid crystal display panel 1510, the black matrix 1516 should be configured to extend to a cutting line 1517 for cutting into an individual module. A sealant is coated on the black matrix 1516 and then attached to the lower substrate 1512.

Thus, if the black matrix 1516 is configured to extend to the cutting line 1517, the sealant comes in contact with the black matrix 1516 only instead of being directly attached to the upper substrate 1511, thereby decreasing adhesive strength. Moreover, when several modules are cut into individual modules, a portion of the black matrix 1516 is cut and lost to cause particle failure or malfunction.

According to the present invention, in order to prevent such failure or malfunction, the black matrix 1516 is not formed on the cutting line 1517 but a light cutoff part 1558 is formed using a sealant in dark color.

Figure 23:
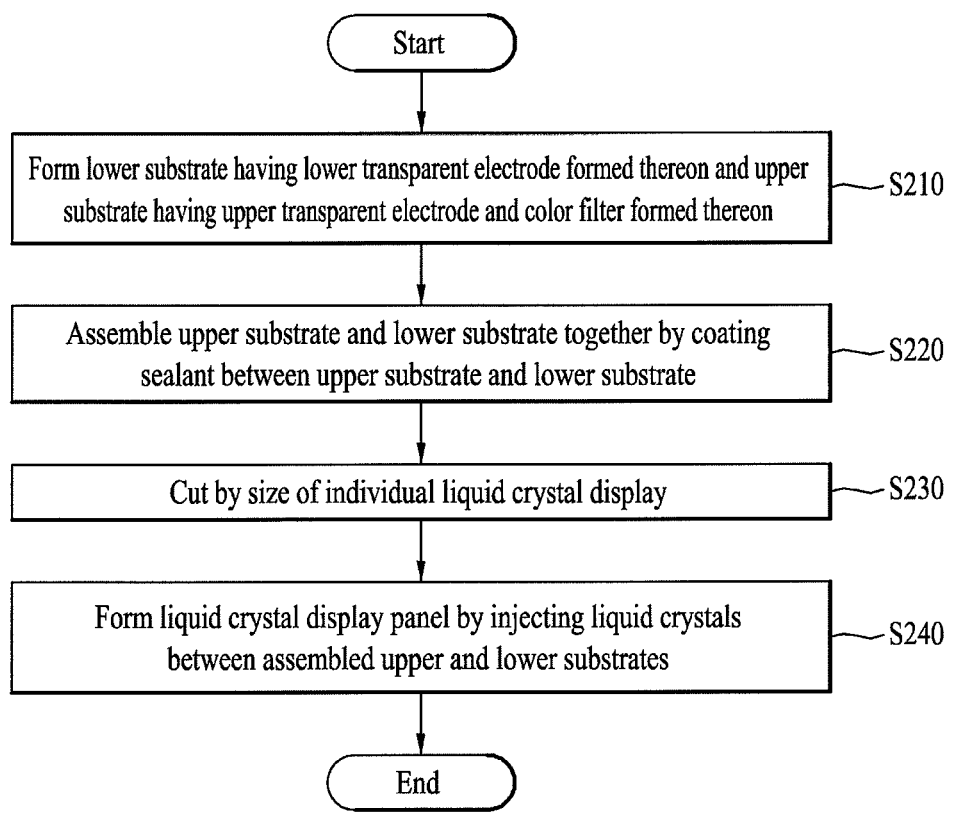
FIG. 23 is a flowchart for a method of fabricating the display module shown in FIG. 22 according to one embodiment of the present invention.

Referring to FIG. 22, the light cutoff part 1558 having the sealant formed in dark color cuts off the light reflected by the lateral side of the lower substrate 1512 or the light, which will be incident on the sidewall of the upper substrate 1511 shown in FIG. 23 in case of using a light-transmittive sealing part 1513, thereby cutting off the leakage of the light reflected by the lateral side of the liquid crystal display panel 1510.

In the following description, a method of fabricating the display module shown in FIG. 22 is explained with reference to FIG. 23.

Referring to FIG. 23, the upper substrate 1511 and the lower substrate 1512 are prepared [S210]. Subsequently, the upper substrate 1511 and the lower substrate 1512 are attached together by coating the sealant between the upper substrate 1511 and the lower substrate 1512 [S220]. As these steps S210 and the S220 are identical to the former steps S110 and S120 shown in FIG. 21, their details shall be omitted from the following description.

Figure 24:
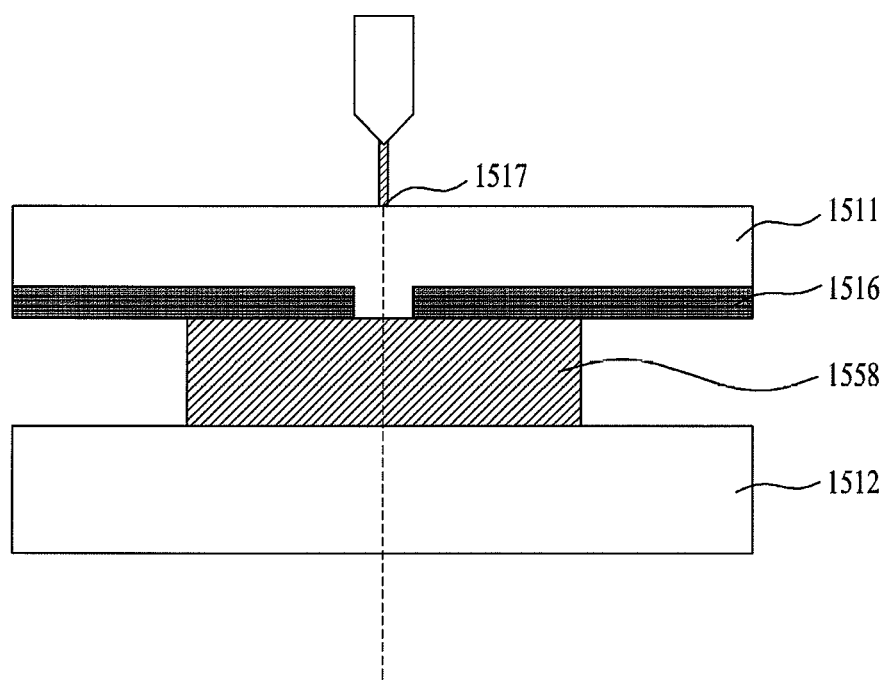
FIG. 24 is a diagram for a method of fabricating the display module shown in FIG. 22 according to another embodiment of the present invention.

The upper substrate 1511 and the lower substrate 1512 are cut into the individual liquid crystal display panels 1510 [S230]. The black matrix 1516 is not formed on the cutting line 1517. And, a black sealant formed part is cut using a laser or the like, as shown in FIG. 24. As the color of the sealant is set to a dark color only, the adhesive strength is maintained. And, the sealant may sufficiently play a role as the sealing part 1513 for the liquid crystal layer.

Generally, an align mark for side alignment is printed on the cutting line 1517. If the sealing part 1513 is formed in dark color, it may cause a problem that the align mark is not clearly viewed. Hence, if the align mark is formed in bright color, a position alignment on stacking can be achieved.

If the sealing part 1513 is formed using the sealant in dark color, UV hardening is unavailable for sealant hardening. Hence, the sealing part 1513 in dark color, i.e., the light cutoff part 1558 is characterized in being hardened by thermal hardening.

Subsequently, liquid crystals are injected between the upper substrate 1511 and the lower substrate 1512 attached together to form the liquid crystal display panel 1510 [S230]. As this step S230 is identical to the former step S130 shown in FIG. 21, its detail shall be omitted from the following description.

As mentioned in the foregoing description, a display module 151 according to one embodiment of the present invention includes a light cutoff part 1550, 1553, 1554, 1555, 1556, 1557 or 1558 to minimize light leakage caused by the light incident on a lateral side of a liquid crystal display panel 1510 by being reflected by a mold 1530 or the light reflected by the lateral side of the liquid crystal display panel 1510, thereby outputting more clear and vivid images.

Moreover, a display module according to another embodiment of the present invention may not include a reflective film 1523 of a backlight unit 1520 but uses a reflective plane or surface, thereby reducing thickness of the backlight unit 1520.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display module comprising:
    a liquid crystal display panel configured to output a color per pixel;
    a backlight unit configured to uniformly project a light to a rear side of the liquid crystal display panel, the backlight unit having a light guide plate and a light source providing a light to a first lateral side of the light guide plate;
    a mold located at a perimeter of the liquid crystal display panel and a perimeter of the backlight unit; and
    a light cutoff part configured to cut off a path of the light incident on a front of the liquid crystal display panel from a side of the liquid crystal display panel,
    wherein the light guide plate includes a chamfer formed between a second lateral side facing the mold and a top side of the light guide plate, the chamfer facing the mold.

2. The display module of claim 1, where the mold is located around the entire perimeter of the liquid crystal display and the entire perimeter of the backlight unit.

3. The display module of claim 1, wherein the mold comprises:
    a support part configured to cover a lateral side of the backlight unit and is attached to a bottom side of the liquid crystal display panel; and
    a sidewall part configured to extend in a front direction to cover a lateral side of the liquid crystal display panel,
    wherein the light cutoff part has a dark color, and
    wherein the light cutoff part is formed on an inner lateral side of the sidewall part opposite to the lateral side of the liquid crystal display panel.

4. The display module of claim 3, wherein the light cutoff part is formed in a manner of pressing a rubber pad having a dark color ink adsorbed thereon on the sidewall part of the mold or being simultaneously formed with the mold by double injection molding.

5. The display module of claim 1, wherein the light cutoff part comprises a scattered reflection pattern on the second lateral side of the light guide plate to scatter reflect the light incident on the second lateral side of the light guide plate.

6. The display module of claim 5, wherein the chamfer has the scattered reflection pattern formed thereon.

7. The display module of claim 1, wherein the light cutoff part comprises a reflective surface provided between the mold and the second lateral side of the light guide plate or on the second lateral side and a bottom side of the light guide plate.

8. The display module of claim 7, wherein the reflective surface is formed by deposited metal, coated metal, or a metal film tape.

9. The display module of claim 1, wherein the light cutoff part comprises a dark color ink layer formed on a lateral side of the liquid crystal display panel.

10. The display module of claim 1, where the liquid crystal display panel comprises:
    an upper substrate having an upper transparent electrode and a color filter formed thereon;
    a lower substrate having a lower transparent electrode formed thereon; and a dark color sealing part formed between a perimeter of the upper substrate and a perimeter of the lower substrate, wherein the light cutoff part includes the dark color sealing part.

11. The display module of claim 1, wherein the mold and the liquid crystal display panel are attached using one of a dark color adhesive agent and a dark color adhesive tape.

12. A mobile terminal comprising:
a front case;
a display module comprising:
a liquid crystal display panel configured to output a color per pixel;
a backlight unit configured to uniformly project a light to a rear side of the liquid crystal display panel, the backlight unit having a light guide plate and a light source providing a light to a first lateral side of the light guide plate;
a mold located at a perimeter of the liquid crystal display panel and a perimeter of the backlight unit; and
a light cutoff part configured to cut off a path of the light incident on a front of the liquid crystal display panel from a side of the liquid crystal display panel; and
a rear case assembled with the front case to cover a rear side of the display module,
wherein the light guide plate includes a chamfer formed between a second lateral side facing the mold and a top side of the light guide plate, the chamfer facing the mold.

13. The mobile terminal of claim 12, wherein the mold comprises:
a support part configured to cover a lateral side of the backlight unit and is attached to a bottom side of the liquid crystal display panel; and
a sidewall part configured to extend in a front direction to cover a lateral side of the liquid crystal display panel,
wherein the light cutoff part has a dark color, and
wherein the light cutoff part is formed on an inner lateral side of the sidewall part opposite to the lateral side of the liquid crystal display panel.

14. The mobile terminal of claim 12, wherein the light cutoff part comprises either a reflective surface or a scattered reflection pattern provided between the mold and the second lateral side of the light guide plate.

15. The mobile terminal of claim 12, wherein the liquid crystal display panel comprises:
an upper substrate having an upper transparent electrode and a color filter formed thereon;
a lower substrate having a lower transparent electrode formed thereon; and
a dark color sealing part formed between a perimeter of the upper substrate and a perimeter of the lower substrate,
wherein the light cutoff part includes the dark color sealing part.

16. A mobile terminal comprising:
a front case having a perforated window formed on a front side of the front case;
a display module comprising:
a liquid crystal display panel assembled with the perforated window to output a desired color per pixel;
a backlight unit configured to uniformly project a light to a rear side of the liquid crystal display panel, the backlight unit having a light guide plate and a light source provided next to a first lateral side of the light guide plate;
a front glass assembled with a front side of the liquid crystal display panel to protect the liquid crystal display panel;
a mold located at a perimeter of the liquid crystal display panel and a perimeter of the backlight unit to cover a lateral side of the backlight unit; and
a case projection part projected between the mold and the front glass from an inside of the front case to provide a light cutoff part; and
a rear case assembled with the front case to cover a rear side of the display module,
wherein the light guide plate includes a chamfer formed between a second lateral side facing the mold and a top side of the light guide plate, the chamfer facing the mold, and
wherein the case projection part contacts the mold and the front glass.

* * * * *